No. 869,707. PATENTED OCT. 29, 1907.
J. M. HANCOCK.
SAW SET.
APPLICATION FILED JUNE 26, 1907.

Witnesses

Inventor
J. M. Hancock,
By Chandler & Chandler
Attorneys

UNITED STATES PATENT OFFICE.

JOEL M. HANCOCK, OF MAGNOLIA, ARKANSAS.

SAW-SET.

No. 869,707.  Specification of Letters Patent.  Patented Oct. 29, 1907.

Application filed June 26, 1907. Serial No. 380,917.

*To all whom it may concern:*

Be it known that I, JOEL M. HANCOCK, a citizen of the United States, residing at Magnolia, in the county of Columbia, State of Arkansas, have invented certain new and useful Improvements in Saw-Sets; and I do hereby declare the following to be a full, clear, and exact description of the invention, such as will enable others skilled in the art to which it appertains to make and use the same.

This invention relates to saw sets and has for its object to provide a tool which may be used in the setting of saws of different gages.

Broadly stated the tool comprises a flat metal plate provided at one of its ends with a tooth for setting the teeth of cross cut saws and at its other end with a plurality of notches for engagement with the teeth of smaller saws to be set.

One of the novel features of the invention resides in beveling that edge of the plate in which the notches are formed in the direction of the decrease in the size of the notches so that in reality, the notches for the larger or thicker teeth are of greater width than the notches of the thin saws. Heretofore in tools of this class, where a plurality of notches are provided, the notches have been formed of different breadths but of the same length and in setting the teeth of thin saws it has been found impractical to rapidly set the teeth without at the same time interfering with adjacent teeth.

Figure 1:
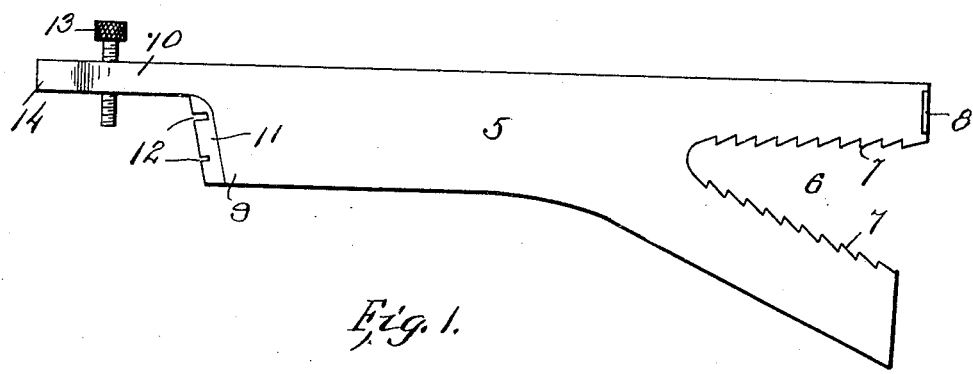
Figure 2:
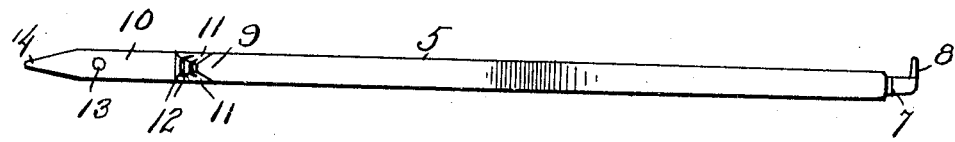
Figure 3:
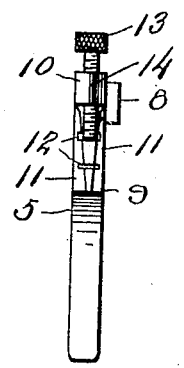

In the accompanying drawings, Figure 1 is a view in elevation of the tool, Fig. 2 is an edge view thereof, and, Fig. 3 is an end view of the tool.

As shown in the drawings the tool is formed of a plate 5 which is bifurcated at one of its ends as at 6 and has the opposing edges of its furcations toothed or serrated as at 7 whereby the tool may be used as an alligator wrench if desired.

Formed integral with one of the furcations is a right-angularly-directed saw-setting tooth 8, which is to be used in setting the teeth of a cross-cut saw. In using the tool for this purpose, the cross-cut saw is laid flat upon a stump or block and the tooth 8 is placed upon the saw tooth to be set and the bifurcation upon which the tooth 8 is formed is then struck sharply with a hammer, resulting, of course, in the bending or setting of the saw-tooth. In order that the tool may be employed for the purpose of setting the teeth of smaller saws, the plate 5 is cut to form an angularly extending shoulder 9 at its end opposite to its bifurcated end, an extension 10 however being left for a purpose which will be presently stated. The shouldered edge 9 of the plate is beveled upon opposite sides as at 11, its resultant edge being broader adjacent the extension 10 than at the outer edge of the tool body and a plurality of notches 12 are formed in the said beveled edge of the shoulder and these notches decrease in size as they approach the narrow end of the said edge, and by reason of the fact that the said edge is beveled and itself narrowed as it approaches its outer end, the notches decrease in length also in the order named. These notches are designed for the reception of the teeth of the saw to be set and it will be understood that the teeth of the smaller saws are engaged in the smaller sized notches and the teeth of the larger saws in the notches of larger size. By reason of the fact that the notches decrease in length in the same order and that they decrease in width, the teeth of an extremely small saw may be set readily and quickly without interfering or bending the adjacent teeth.

Engaged through the extension 10 is a set screw 13 which, as the tool is rocked to bend the said tooth of a saw strikes the saw when the tooth has been bent to the proper degree and indicates to the operator this fact, it being understood that the said set screw may be adjusted to permit of the teeth being set to a greater or less degree as may be found expedient. If desired the extreme end of the extension 10 may be beveled as at 14 to form a screw driver.

What is claimed, is—

A tool of the class described comprising a flat body portion, said body portion being provided at one of its ends with a shoulder cut at an angle and beveled upon opposite sides, whereby its edge is decreased in width toward its outer end, there being a plurality of notches formed in the said beveled angularly cut edge of the shoulder, the notches of the series being decreased in width and length as they approach the said outer end of the said shoulder, an extension formed integral with the body of the tool and projecting beyond the said shoulder, and a set screw engaged through the extension.

In testimony whereof, I affix my signature, in presence of two witnesses.

JOEL M. HANCOCK.

Witnesses:
 GEO. W. MONROE,
 T. P. GANTT.